No. 656,178. Patented Aug. 21, 1900.
T. D. DERSHIMER.
TREAD POWER.
(Application filed Apr. 5, 1900.)

(No Model.) 2 Sheets—Sheet 1.

Witnesses
Jno. Irwin
Gladys L. Thompson

Inventor
Titus D. Dershimer

By R.S. & A.B. Lacey his Attorneys

THE NORRIS PETERS CO., PHOTO-LITHO., WASHINGTON, D. C.

No. 656,178. Patented Aug. 21, 1900.
T. D. DERSHIMER.
TREAD POWER.
(Application filed Apr. 5, 1900.)
(No Model.) 2 Sheets—Sheet 2.
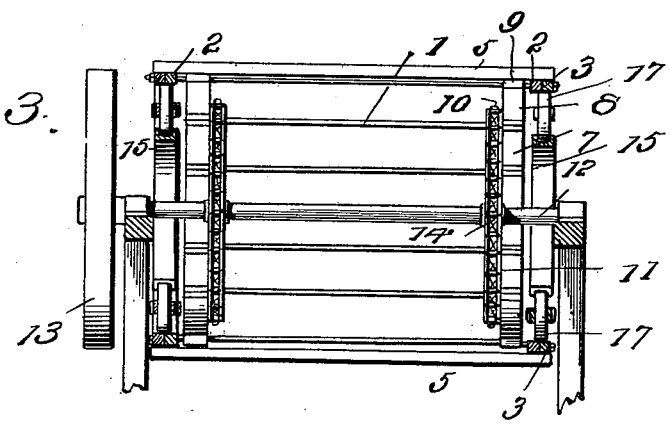
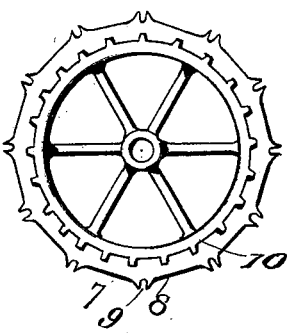
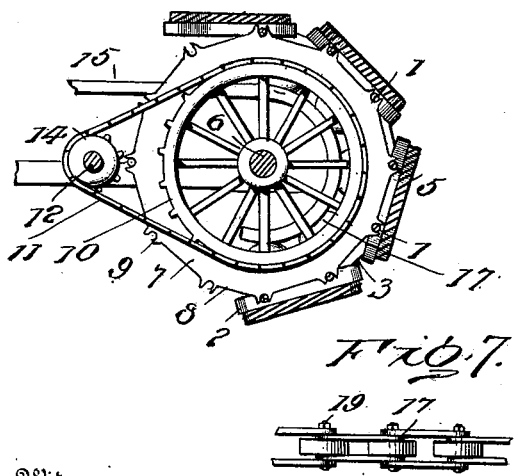
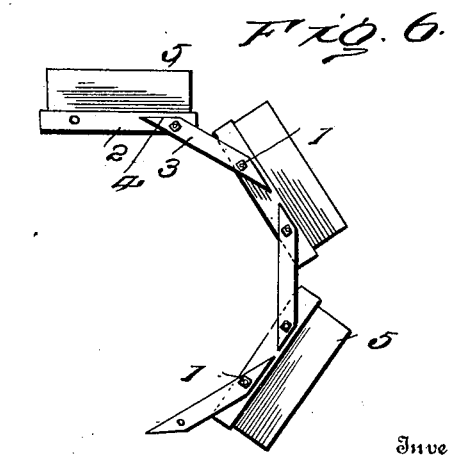
Inventor
Titus D. Dershimer
Witnesses
By R.S.&A.B. Lacey his Attorneys

UNITED STATES PATENT OFFICE.

TITUS D. DERSHIMER, OF SQUARE TOP, PENNSYLVANIA.

TREAD-POWER.

SPECIFICATION forming part of Letters Patent No. 656,178, dated August 21, 1900.

Application filed April 5, 1900. Serial No. 11,761. (No model.)

*To all whom it may concern:*

Be it known that I, TITUS D. DERSHIMER, a citizen of the United States, residing at Square Top, in the county of Wyoming and State of Pennsylvania, have invented certain new and useful Improvements in Tread-Powers; and I do hereby declare the following to be a full, clear, and exact description of the invention, such as will enable others skilled in the art to which it appertains to make and use the same.

This invention relates to tread-mills for operating machinery, the purpose being to improve the general construction and reduce the friction to the smallest amount possible and to increase the life and capabilities of this class of motive powers. In its organization the power comprises a track, an endless tread composed of independent chains and slats attached to corresponding links and forming the tread elements, and independent endless rotary supports between the track and chains of the tread to relieve the friction incident to the traveling of the tread when the power is in operation, the links of the tread-chains being of greater length than the distance between adjacent rollers of the rotary supports and corresponding links being connected by tie-rods, which also pivotally connect the overlapping end portions of subjacent links.

The invention also consists of the novel features, details of construction, and combination of the parts, which hereinafter will be more fully disclosed and finally claimed; and for this purpose and also to acquire a knowledge of the merits of the invention and the structural details of the means whereby the results are attained reference is to be had to the appended description and the drawings hereto attached.

While the essential and characteristic features of the invention are necessarily susceptible of modification, still the preferred embodiment of the invention is illustrated in the accompanying drawings, in which—

Figure 1:
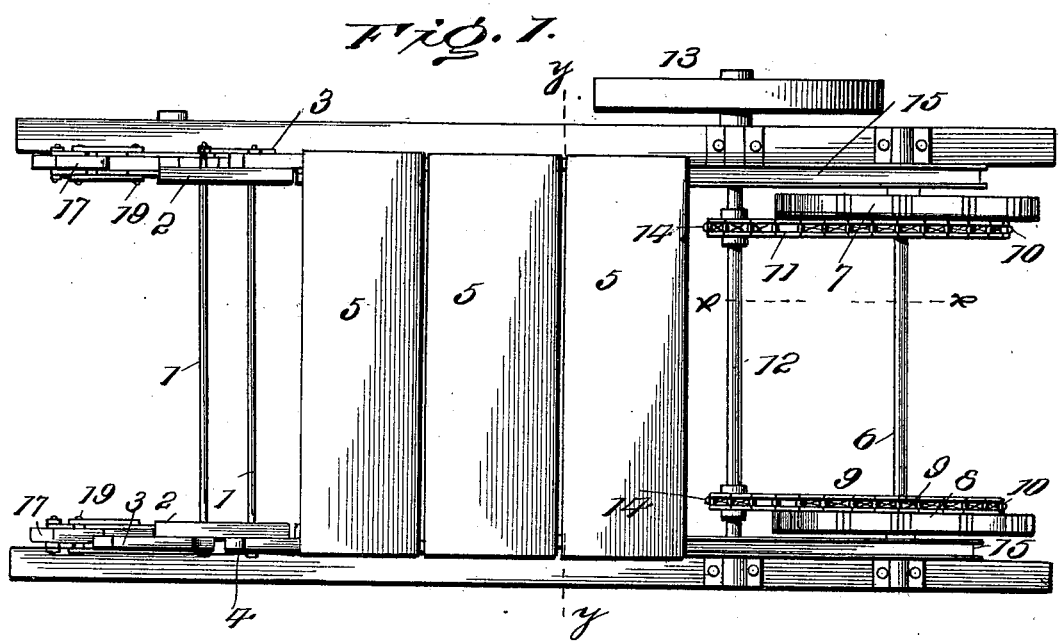
Figure 2:
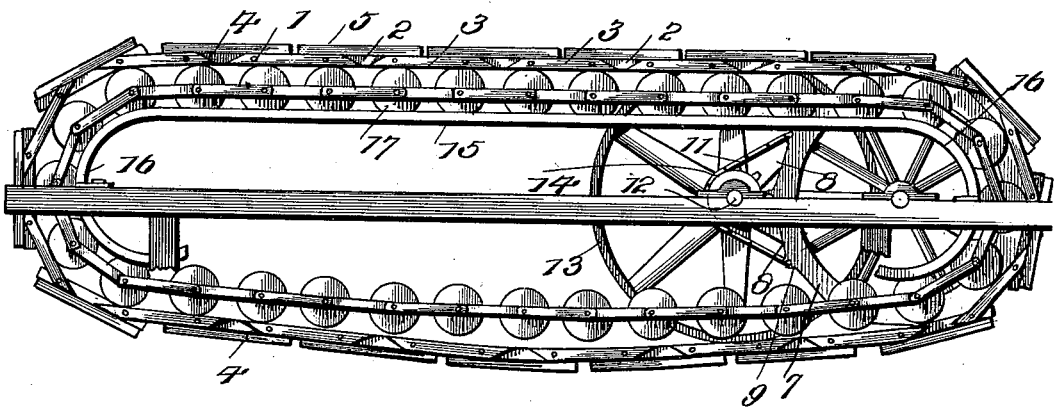

Figure 1 is a top plan view of the tread-power constructed in accordance with the principles of this invention, parts being removed to show more clearly the structural details and relative arrangement of the co-operating parts. Fig. 2 is a side elevation. Fig. 3 is a transverse section on the line Y Y of Fig. 1. Fig. 4 is a longitudinal section of an end portion of the tread on a larger scale, taken on the line X X of Fig. 1. Fig. 5 is a detail view of a supporting-pulley, showing cog-teeth combined therewith. Fig. 6 is a detail view of a portion of the endless tread, showing the disposition of the links when passing around a supporting-pulley. Fig. 7 is a top plan view of a portion of an endless rotary support for the tread.

Corresponding and like parts are referred to in the following description and indicated in all the views of the drawings by the same reference characters.

The endless tread is composed of independent side chains similarly constructed and having corresponding links connected by tie-rods 1, which likewise form the pivotal connection between subjacent links. Each chain is composed of two sets of links 2 and 3 of equal length, the links 2 having square ends and the links 3 having their ends oppositely beveled, as shown at 4. The square-ended links 2 are located upon the inner side of the chains, and the slats or treads 5 are bolted or otherwise firmly attached thereto. The bevel-ended links 3 are arranged upon the outer sides of the chains and overlap the links 2 and are pivoted thereto by the terminal portions of the rods 1, the pivotal connection between the links being one-fourth their length from their extremities. The end portions of the treads 5 overlap the outermost links 3 of the endless chains, and the bevel at the ends of the links 3 must be such as to clear the inner sides of the treads when the latter are passing around the supporting-pulleys.

The end shaft 6 is provided with pulleys 7, one for each endless chain of the tread, and these supporting-pulleys are provided with seats 8 to receive the terminal portions of the treads or slats 5 and notched projections 9 intermediate of the seats 8 to receive the terminal portions of the tie-rods 1. This construction prevents possible slipping of the endless tread upon the supporting-pulleys and insures both endless chains traveling at an equal speed. Each one of the pulleys 7 is provided with cogs 10 at one side to receive a sprocket-chain 11, by means of which power is transmitted to a shaft 12, from which power is taken for operating machinery by means of a belt applied to a pulley 13, secured to a projecting end of the shaft 12, said drive-chain 11 passing around a sprocket-wheel 14, applied to the said shaft 12.

A track 15 is located at each side of the power adjacent to the topmost portion of the endless tread, and its end portions curve and are concentric with the shafts 6, as shown at 16. This track is provided with side flanges or is grooved in its top or outer side to receive the rollers 17 of the rotary support. This track is substantial and supports the endless tread and the antifriction means therefor.

The rotary support located intermediate of the track 15 and the endless tread consists of an endless chain 18 and rollers 17, the distance between the centers of adjacent rollers 17 being less than the length of the links 2 and 3, which is essential in order to prevent any sagging of the tread should the joint between the links of its chains come opposite the space between adjacent rollers 17. One rotary support will be provided for each endless chain of the tread, and the rollers 17 will be located between corresponding side chains composed of links having their end portions overlapped and pivotally connected by the same means, forming axes for the rollers 17, the connecting means 19 being pins, bolts, or the like. The rotary supports are independent of each other and are free to travel upon the individual tracks 15, and their sole purpose is to relieve the friction between the endless tread and the track, whereby the power is lighter running and more durable and less liable to get out of repair.

The curved portions 16 of the tracks are of such diametrical extent as to prevent excessive strain and load coming upon the supporting-pulleys 7, and the latter are provided for the sole purpose of taking power from the endless tread, so as to transmit the same to the shaft 12 for available use.

Having thus described the invention, what is claimed as new is—

A tread-power comprising transversely-spaced tracks having opposite curved end portions, independent endless antifriction devices supported by the said tracks and comprising chains and rollers mounted upon the link connections of the chains, side chains composed of alternately-arranged square-ended and bevel-ended links, transverse rods pivotally connecting transversely-alined links of the side chains, treads secured to the square-ended links, a shaft 6 at one end of the tread-power and concentric with the adjacent curved ends of the tracks, pulleys secured to the end portions of the said shaft and having notched projections and depressed portions intermediate of the said notched projections and provided at one side with cog-gearing, and a shaft 12 parallel with the shaft 6 and geared to the cog-gearing of the pulleys thereof, and provided with a belt-pulley, substantially as described.

In testimony whereof I affix my signature in presence of two witnesses.

TITUS D. DERSHIMER. [L. S.]

Witnesses:
    T. H. CLEMENS,
    E. L. WALTER.